United States Patent
Jess

(10) Patent No.: US 8,225,146 B2
(45) Date of Patent: Jul. 17, 2012

(54) METHOD FOR IMPLEMENTING CONTINUOUS DATA PROTECTION UTILIZING ALLOCATE-ON-WRITE SNAPSHOTS

(75) Inventor: Martin Jess, Erie, CO (US)

(73) Assignee: LSI Corporation, Milpitas, CA (US)

( * ) Notice: Subject to any disclaimer, the term of this patent is extended or adjusted under 35 U.S.C. 154(b) by 281 days.

(21) Appl. No.: 12/551,593

(22) Filed: Sep. 1, 2009

(65) Prior Publication Data

US 2011/0055624 A1  Mar. 3, 2011

(51) Int. Cl.
*G06F 11/00* (2006.01)
(52) U.S. Cl. ........ 714/100; 711/114; 711/159; 707/648; 707/649; 709/217
(58) Field of Classification Search .................. 711/114, 711/162, 159; 709/217; 707/648, 649
See application file for complete search history.

(56) References Cited

U.S. PATENT DOCUMENTS

| | | | |
|---|---|---|---|
| 6,212,531 B1 | 4/2001 | Blea | |
| 6,732,125 B1 | 5/2004 | Autrey | |
| 7,383,381 B1 | 6/2008 | Faulkner | |
| 2005/0171979 A1 | 8/2005 | Stager | |
| 2007/0033370 A1 | 2/2007 | Zohar et al. | |
| 2007/0067583 A1 | 3/2007 | Zohar et al. | |
| 2007/0183224 A1 | 8/2007 | Erofeev | |
| 2007/0245107 A1 | 10/2007 | Kano | |
| 2007/0276878 A1 | 11/2007 | Zheng et al. | |
| 2008/0040402 A1 | 2/2008 | Judd | |
| 2008/0091744 A1 | 4/2008 | Shitomi et al. | |
| 2008/0228833 A1 | 9/2008 | Kano | |
| 2008/0281876 A1 | 11/2008 | Mimatsu | |
| 2008/0282049 A1 | 11/2008 | Kawamura et al. | |

*Primary Examiner* — Robert Beausoliel, Jr.
*Assistant Examiner* — Jeison C Arcos
(74) *Attorney, Agent, or Firm* — Suiter Swantz pc llo

(57) ABSTRACT

The present disclosure is directed to a method for providing continuous data protection for a virtual volume (VV). The method may comprise conceptually dividing the VV into a plurality of same sized chunks; preserving contents of the VV at a specified time; creating a Point in Time (PiT) instance for the VV at the specified time, comprising: a PiT Temporary Virtual Volume (PTVV) for storing modifications to the VV subsequent to the specified time, wherein data stored in the PTVV is prohibited from been overwritten; a re-allocation table for providing read access to a most recent version of each of the plurality of chunks of the VV; and a Continuous Data Protection (CDP) log for providing read access to a historic version of a chunk stored in the PTVV; and updating the PiT instance when a chunk of the plurality of chunks of the VV is being modified.

18 Claims, 5 Drawing Sheets

METHOD FOR IMPLEMENTING CONTINUOUS DATA PROTECTION UTILIZING ALLOCATE-ON-WRITE SNAPSHOTS

FIELD OF THE INVENTION

The present invention relates to the field of electronic data storage and particularly to a system and method for providing continuous data protection utilizing allocate-on-write snapshots.

BACKGROUND OF THE INVENTION

Users of Information Technology (IT) may perform backups of critical data to protect against a catastrophic failure. In case such a catastrophic failure occurs, the backups may be utilized for restoring the critical data to the IT systems. Traditional backups may only restore data to the point in time at which the backup was taken/performed. If the backups are performed according to a certain schedule (e.g., once a day, once a week, etc), this may mean that depending on when the catastrophic failure occurred, the copy of critical data on the backup media may be relatively old and may require substantial additional processing to bring the IT system back to where it was before the failure. Furthermore, the most recent backup data itself may be partially compromised (e.g., infected by a virus), which may require the user to revert to an even older copy (if one is available).

SUMMARY OF THE INVENTION

Accordingly, an embodiment of the present disclosure is directed to a method for providing continuous data protection for a virtual volume. The method may comprise conceptually dividing the virtual volume into a plurality of same sized chunks; preserving contents of the virtual volume and prohibiting direct write access to the virtual volume at a first specified time; creating a first Point-in-Time (PiT) instance for the virtual volume at the first specified time, the first PiT instance comprising: a first PiT Temporary Virtual Volume (PTVV) configured for storing modifications to the virtual volume subsequent to the first specified time, wherein data stored in the first PTVV is prohibited from been overwritten; a first re-allocation table including an entry for each of the plurality of chunks of the virtual volume, the first re-allocation table configured for providing read access to a most recent version of each of the plurality of chunks of the virtual volume; and a first Continuous Data Protection (CDP) log configured for providing read access to a historic version of a chunk stored in the first PTVV; and updating the first PiT instance when a chunk of the plurality of chunks of the virtual volume is being modified.

A further embodiment of the present disclosure is directed to a method for creating a restore instance for a virtual volume. The method may comprise receiving a restore time; identifying a Point-in-Time (PiT) instance having a most recent creation time that is prior to the restore time; copying a re-allocation table of an identified PiT instance to a re-allocation table of the restore instance; and updating the re-allocation table of the restore instance based on a Continuous Data Protection log (CDP log) of the identified PiT instance and the restore time.

An additional embodiment of the present invention is directed to a system for providing continuous data protection for a virtual volume. The system may comprise means for conceptually dividing the virtual volume into a plurality of same sized chunks; means for preserving contents of the virtual volume and prohibiting direct write access to the virtual volume at a first specified time; means for creating a first Point-in-Time (PiT) instance for the virtual volume at the first specified time, the first PiT instance comprising: a first PiT Temporary Virtual Volume (PTVV) configured for storing modifications to the virtual volume subsequent to the first specified time, wherein data stored in the first PTVV is prohibited from been overwritten; a first re-allocation table including an entry for each of the plurality of chunks of the virtual volume, the first re-allocation table configured for providing read access to a most recent version of each of the plurality of chunks of the virtual volume; and a first Continuous Data Protection (CDP) log configured for providing read access to a historic version of a chunk stored in the first PTVV; and means for updating the first PiT instance when a chunk of the plurality of chunks of the virtual volume is being modified.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Continuous Data Protection (CDP, also known as continuous backup or real-time backup) refers to backup of computer data by automatically saving a copy of every change made to that data, essentially capturing every version of the data that the user creates. Utilizing CDP may enable users and/or administrators to restore data to a point in time depending on the mechanism of the CDP employed.

Certain CDP mechanisms may utilize a snapshot approach where a snapshot of critical data is automatically taken at frequent intervals. Snapshot mechanisms may be configured to capture only the differences in the data relative to the original rather than creating a complete copy for each snapshot. Snapshot mechanisms may also utilize a "sliding window" approach, where the oldest snapshot may be deleted when the total number of snapshots captured for a logical unit (LU) reaches a certain threshold.

The present disclosure is directed to a method for providing continuous data protection for a logical unit. The logical unit may be mapped to a virtual volume, which may be conceptually divided into a plurality of same sized chunks. Point-in-Time (PiT) instances may be created for the virtual volume at specified times. A PiT instance may include a PiT Temporary Virtual Volume (PTVV) that stores the changes made to the virtual volume since this PiT was created. The PTVV for each PiT instance may be configured for storing all modifications to the virtual volume while this PiT instance is active (an PiT instance is active between the time of creation of the PiT instance and the time of creation of a subsequent PiT instance). In this manner, if a particular chunk of the virtual volume is updated five times while a PiT instance is active, the PTVV of this PiT instance may store five versions of data content for this particular chunk. In one embodiment, the data stored in the PTVV is prohibited from been overwritten.

A re-allocation table may be utilized by the PiT instance for accessing the most recent version of each chunk of the virtual volume. A Continuous Data Protection (CDP) log may be utilized for providing access to older versions of the chunks stored in the PTVV. In this manner, a mechanism may be provided for creating a restore instance for a particular time in the past at the granularity of individual write operations.

Figure 1:
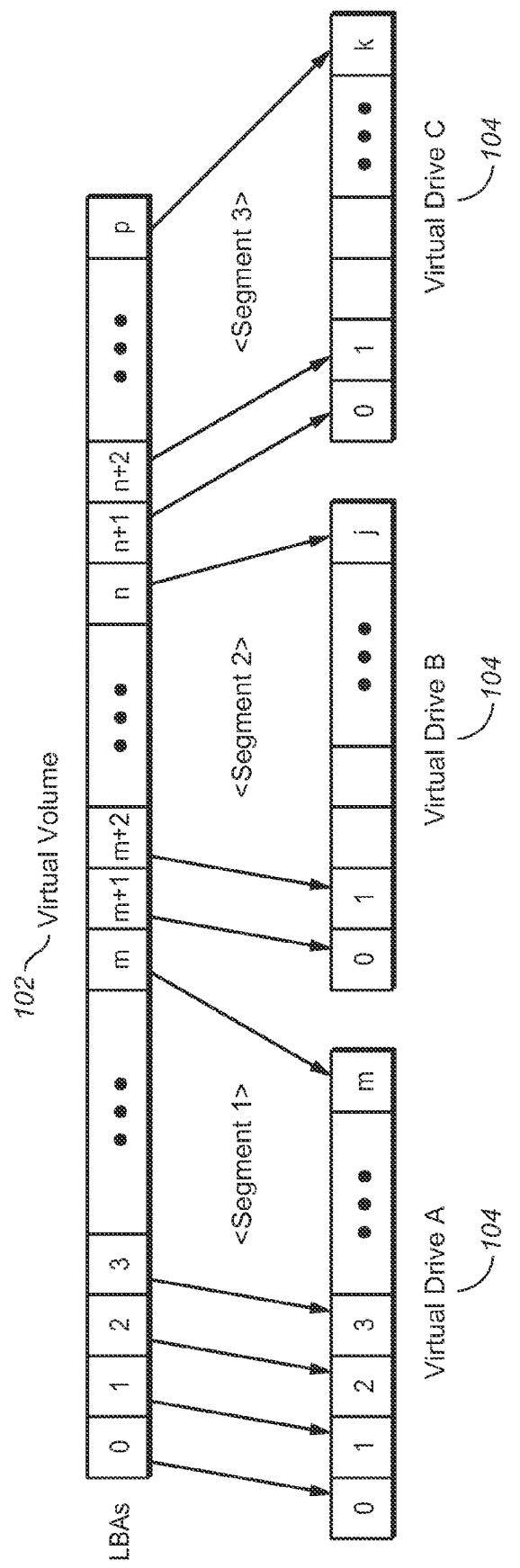
FIG. 1 is a block diagram illustrating a virtual volume configuration.

Referring to FIG. 1, there is shown a block diagram illustrating a virtual volume configuration. In one embodiment, a logical unit (LU) may be mapped to a virtual volume 102 of a storage device (e.g., a storage array or a redundant array of independent disks). A Storage Virtualization Manager (SVM) deployed in the storage device may be utilized to facilitate such mappings. The virtual volume 102 may include one or more virtual volume segments 104. Each virtual volume segment 104 may represent a mapping of a virtual volume logical block address (LBA) range to a virtual drive LBA range. A virtual drive may correspond to a storage allocation in the storage device. For example, a virtual drive may correspond to a RAID volume.

Figure 2:
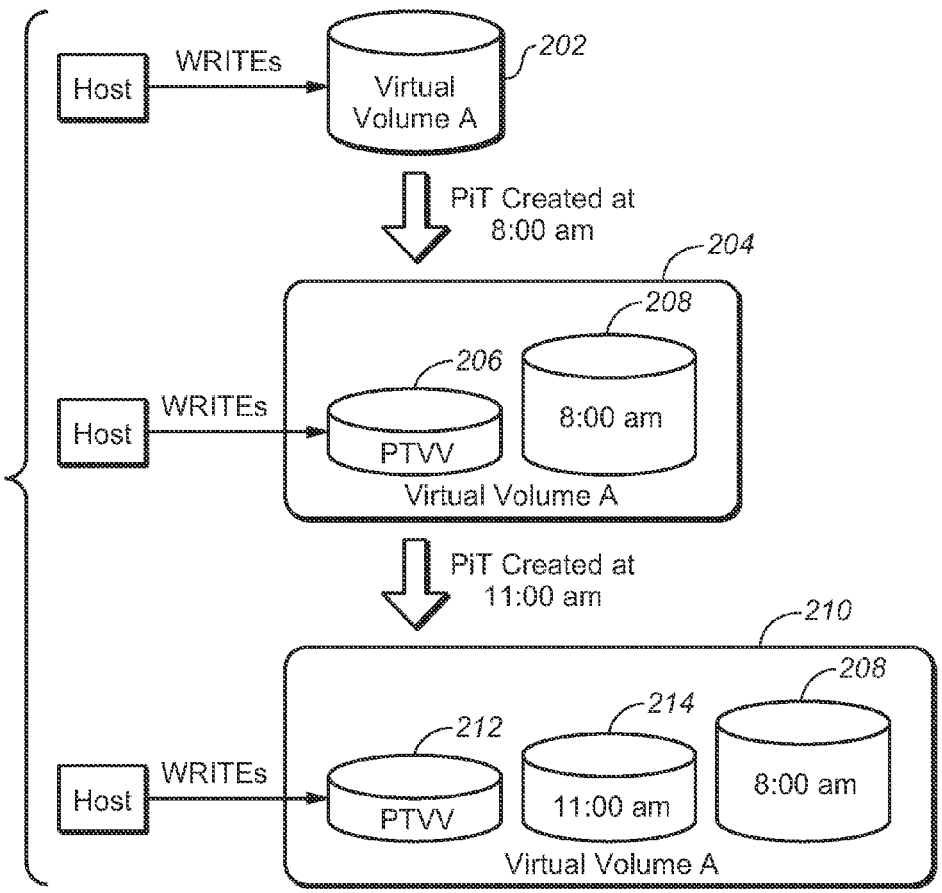
FIG. 2 is a block diagram illustrating a snapshot mechanism for creating Point-in-Time (PiT) instances for a virtual volume.

Referring to FIG. 2, there is shown a block diagram illustrating a snapshot mechanism for creating Point-in-Time (PiT) instances for a virtual volume. For example, the SVM may be configured for creating a first PiT instance for the virtual volume 202 at a first specified time (e.g., at 8:00 AM). Prior to 8:00 AM, write commands issued from a host to the virtual volume 202 may modify the data content of the virtual volume 202 directly. However, at 8:00 AM, the data content of the virtual volume freezes and a first PiT Temporary Virtual Volume (PTVV) 206 is created for holding all changes to the virtual volume subsequent to the first specified time of 8:00 AM. Consequently, the data content of the virtual volume 202 prior to 8:00 AM is preserved as a frozen image 208 at the time the first PiT instance was created. The frozen image 208 protects the contents of the virtual volume 202 and prohibits write access to the virtual volume 202 starting from 8:00 AM. It is understood that the snapshot mechanism for creating PiT instances for the virtual volume may be transparent to the host accessing the virtual volume. In the above example, the PTVV 206 and the frozen image 208 together may serve as a current virtual volume 204, which may be transparent to the host accessing the virtual volume.

The SVM may be further configured for creating a second PiT instance for the virtual volume at a second specified time (e.g., at 11:00 AM). In this example, changes to the virtual volume made between 8:00 AM and 11:00 AM may be held at the first PTVV 206. At 11:00 AM, the data content of the first PTVV 206 freezes and a second PTVV 212 is created in replacement of the first PTVV 206 for holding all changes to the virtual volume subsequent to the second specified time of 11:00 AM. Consequently, the content of the first PTVV 206 is preserved as a frozen image 214 at the time the second PiT instance was created, along with the frozen image 208 of the original virtual volume taken at the first specified time. The PTVV 212, the frozen image 214 of the first PTVV, and the frozen image 208 of the original virtual volume together may serve as a current virtual volume 210, which may be transparent to the host accessing the virtual volume.

Additional PiT instances may be created for the virtual volume. Each PiT instance may include a new PTVV for holding changes to the virtual volume subsequent to the creation of the PiT instance. Each PiT instance may have read access to the frozen image 208 of the original virtual volume and the frozen images of previous PTVVs (e.g., frozen image 214 of the first PTVV). It is contemplated that the PiT creation times may be specified on-demand (e.g., via a command) or configured based on a predetermined time interval (e.g., every hour).

Figure 3:
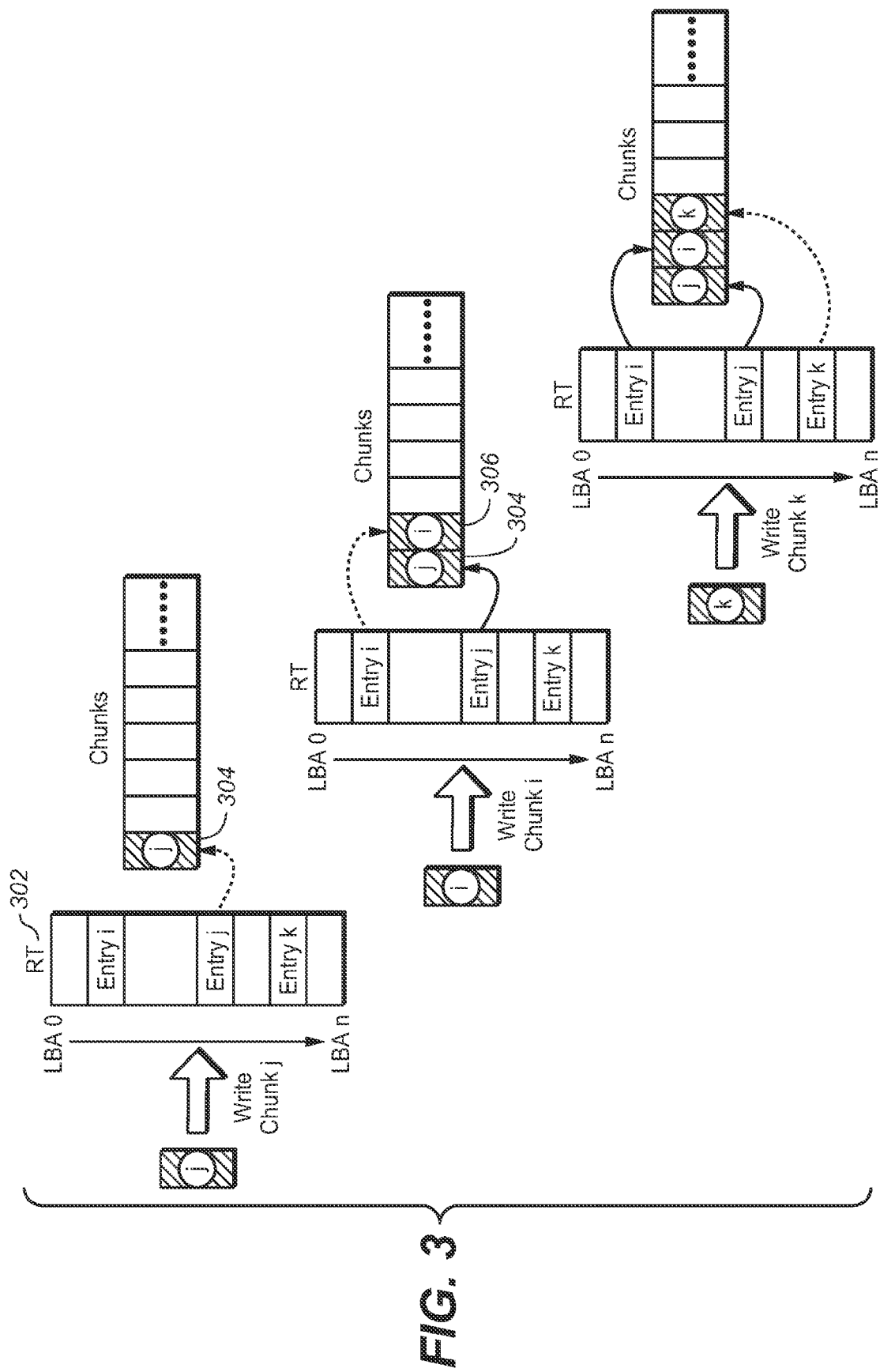
FIG. 3 is an illustration depicting a re-allocation table (RT) utilized by a PTVV for holding changes to a virtual volume.

Referring to FIG. 3, there is shown a re-allocation table (RT) utilized by a PTVV for holding changes to the virtual volume. In one embodiment, the LBA range of the virtual volume may be conceptually divided into equal sized chunks. The size of the chunks may correspond to the granularity of data restoration. For example a chunk size of 8 bytes may indicate that the granularity of data restoration is every 8 bytes of data written to the virtual volume.

A re-allocation table 302 may be created for each PiT instance. In one embodiment, the re-allocation table 302 may contain an entry for each chunk in the virtual volume. When a chunk is written by a host after the PiT instance is created, the corresponding entry in the re-allocation table for this chunk may be located and marked as "allocated". The data content of this chunk may be placed/stored in the PTVV at the next available LBA. The entry for this chunk in the re-allocation table 302 may be associated (e.g., via a reference or a pointer) with the data content of the chunk stored in the PTVV. The re-allocation table may track a timestamp for each entry which reflects when the chunk was written/updated.

In the example illustrated in FIG. 3, upon receiving a write command to chunk "j", the PTVV may locate the entry for chunk "j" in the re-allocation table 302 and mark this entry as "allocated". The PTVV may store the data content of the chunk "j" in the next available LBA 304 accessible to the PTVV. The PTVV may further associate the entry for chunk "j" in the re-allocation table 302 and the data content of the chunk "j" stored at LBA 304.

Subsequent write command to other chunks may be handled similarly. For example, upon receiving a write command to chunk "i", the PTVV may locate the entry for chunk "i" in the re-allocation table 302 and mark this entry as "allocated". The PTVV may store the data content of the chunk "i" in the next available LBA 306 accessible to the PTVV. The PTVV may further associate the entry for chunk "i" in the re-allocation table 302 and the data content of the chunk "i" stored at LBA 306. It is understood that the order of the chunks placed/stored in the PTVV may not necessarily correspond to their order in the original virtual volume. In one embodiment, the chunks in the PTVV are placed in the order as they are written, as illustrated in FIG. 3.

In one embodiment, the re-allocation table entry for a particular chunk in the current/active PiT instance always points to the most recent version of this particular chunk (i.e., the valid chunk). It is understood that the most recent version of a particular chunk may be created/updated prior to the creation of the current PiT instance. That is, the data content of this particular chunk may be stored in a previous PTVV. The associations of entries in the re-allocation table and the valid chunks are illustrated in FIG. 4.

Figure 4:
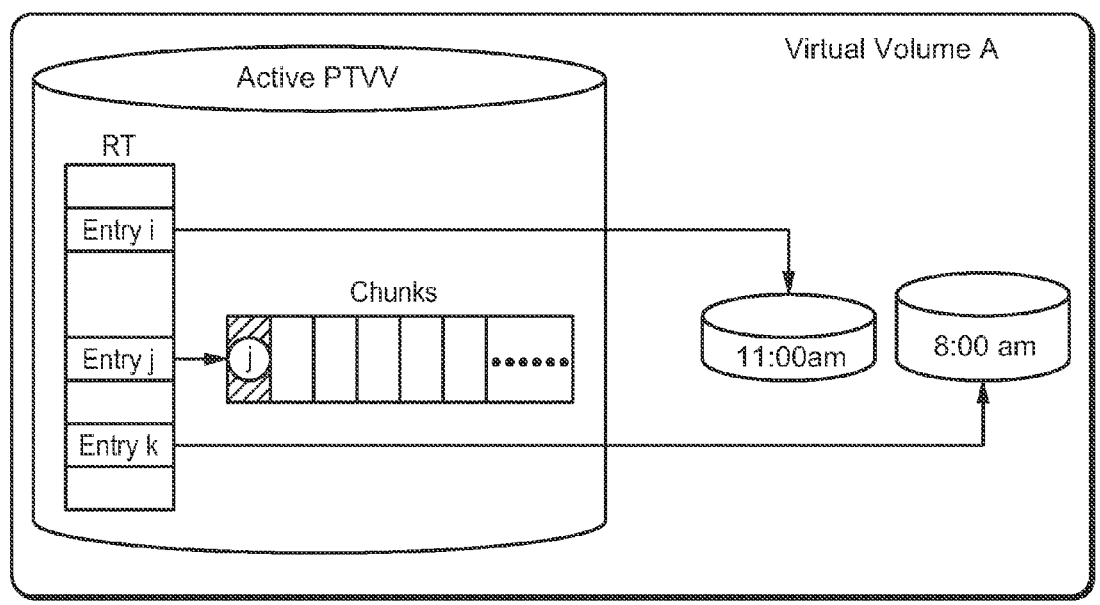
FIG. 4 is an illustration depicting associations of entries in a re-allocation table and chunks of a virtual volume.

In an example illustrated in FIG. 4, chunk "j" may be written after the creation of the current PiT instance (i.e., after 11:00 AM in this example). Thus, the data content of chunk "j" may be stored in the current/active PTVV. Chunk "i" may be most recently written sometime between 8:00 AM and 11:00 AM. Thus, the data content of chunk "i" may be stored in a previous PTVV that was active between 8:00 AM and 11:00 AM, which is now protected from write command but still available for read access. The entry for chunk "i" in the re-allocation table of the current PiT instance may therefore point to the data content of chunk "i" stored in the previous PTVV for read access. Furthermore, Chunk "k" may be most recently written prior to 8:00 AM, which is prior to the creation of the first PiT instance in this example. Thus, the data content of chunk "k" may be stored in the virtual volume itself, which is now protected from write command but still available for read access. The entry for chunk "k" in the re-allocation table of the current PiT instance may therefore point to the data content of chunk "k" stored in the original virtual volume for read access.

In one embodiment, the data content of a chunk, once stored in the PTVV, is protected and may not be overwritten. When a write operation is processed for a chunk that is already allocated in the re-allocation table, the previous/historical versions of the chunk are kept in the PTVV and the new version of the chunk is stored at a new location in the PTVV (e.g., at the next available LBA). A CDP log may be utilized for maintaining and providing access to historical versions for the chunk. In one embodiment, the CDP log may be kept per PiT instance. The CDP log may be implemented utilizing a fast persistent memory, such as NVSRAM, battery backed cache memory, dump device backed cache memory, Solid State Drive (SSD), etc.

Figure 5:
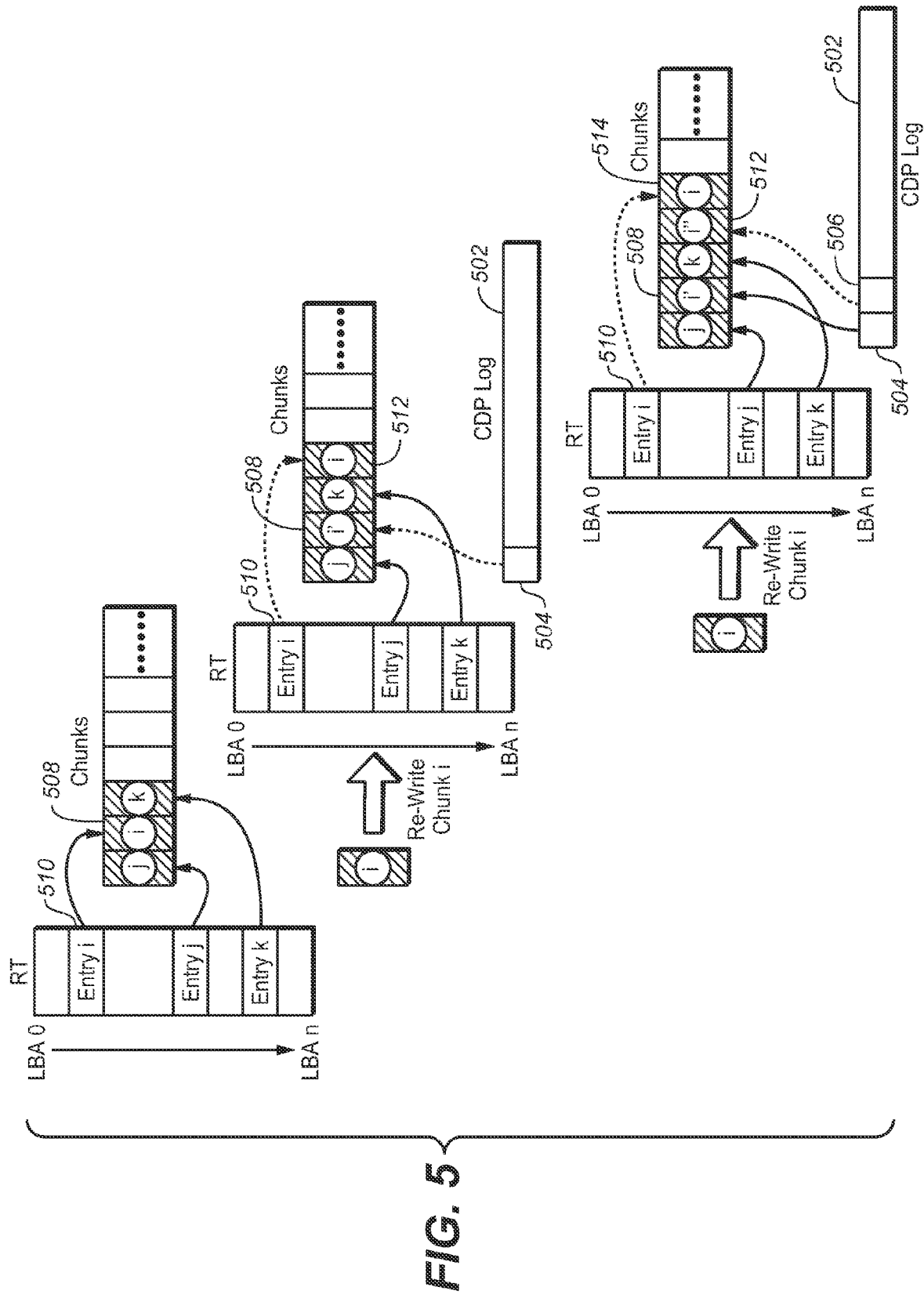
FIG. 5 is an illustration of a continuous data protection log.

Referring to FIG. 5, there is shown an illustration of the CDP log 502. In one embodiment, an entry for a particular chunk in the re-allocation table always points to the most recent version of this particular chunk. When a write command is processed for chunk "i", which is already allocated in the re-allocation table, the updated data content 512 for chunk "i" is stored in the PTVV at the next available slot and the entry for chunk "i" in the re-allocation table 510 is updated to point to the updated data content 512. The previous data content for chunk "i" 508 may remain in the PTVV, but may not be directly accessible through the re-allocation table. A new record 504 associated with the previous data content for chunk "i" 508 may be added to the CDP log 502. In one embodiment, the new record 504 may include a timestamp for chunk 508, a pointer to the data content of chunk 508 stored in the PTVV (e.g., a starting LBA for the chunk), and an association with the re-allocation table entry (e.g., a chunk identifier indicating that this CDP log entry is for chunk "i", or a pointer to the entry in the re-allocation table). It is understood that the operations performed on the PTVV and the CDP log may be transparent to the initiator of the write command, and the status of the write command may be reported to the initiator upon completion of the operations.

Similarly, when a second write command is processed for chunk "i", the updated data content 514 for chunk "i" is stored in the PTVV at the next available slot and the entry for chunk "i" in the re-allocation table 510 is updated to point to the updated data content 514. The previous data contents for chunk "i", i.e., chunk 508 and 512 may both remain in the PTVV, but may not be directly accessible through the re-allocation table. The existing CDP log entry 504 may remain, and another CDP log entry 506 associated with the chunk 512 may be added to the CDP log 502.

The PTVV and the CDP log of a PiT instance together may provide a mechanism for creating a restore instance for a particular time in the past at the granularity of individual write operations. For example, a user may create a restore instance for the virtual volume by specifying a particular restore time (i.e., a time in the past). The restore instance created may reflect the data contents of the virtual volume at the user specified restore time.

In one embodiment, upon receiving the restore time specified, the restore mechanism may identify and select a PiT instance with the most recent creation time that is prior to the restore time. For example, if the virtual volume has PiT instances created at 7:00 AM, 8:00 and 9:00 AM, and the user specified restore time is 8:30 AM, the PiT instance created at 8:00 AM would be selected for it has the most recent creation time that is prior to 8:30 AM.

The selected PiT instance may be utilized as a basis for creating the restore instance. For example, the restore mechanism may be configured to copy the re-allocation table of the select PiT instance to the restore instance. The restore mechanism may then update the re-allocation table and associate the appropriate chunks from the select PiT instance with the restore instance based on the CDP log entries and the restore time specified. For example, the restore mechanism may identify CDP log entries that were created for a particular chunk of the virtual volume. The restore mechanism may then identify among these CDP log entries a particular log entry that has the most recent creation time which is prior to the restore time. This particular log entry (may be referred to as restore log entry) reflects the data content of this chunk at the restore time. The restore mechanism may locate the entry for this chunk in the re-allocation table of the restore instance, and associate the entry for this chunk with data content that the restore log entry is associated with. It is contemplated that the actual data contents of the appropriate chunks from the select PiT instance may be copied to the restore instance. Alternatively, once the appropriate chunks from the select PiT instance are identified, the restore instance may point to (e.g., via a reference or a pointer) the identified appropriate chunk using the CDP log entries of the restore instance.

It is understood that the restore mechanism may repeat the process for other chunks that has CDP log entries associated with them. The restore instance with the updated re-allocation table may reflect the virtual volume contents at the specified restore time. The user may have the option to create a view of the virtual volume utilizing the restore instance or to restore the virtual volume to the restore instance thus changing the virtual volume contents to be those of the specified restore time.

It is contemplated that a PiT instance may grow quickly depending on the I/O pattern on the virtual volume. For example, there may be many versions of the same chunk in the PTVV if the same chunk is frequently "overwritten". A schedule may be utilized for controlling the active duration of a PiT instance. For example, a schedule may specify that a new PiT instance is to be created every hour for frequently updated virtual volumes. In another example, a different schedule may specify that a new PiT instance is to be created every three hours for infrequently updated virtual volumes.

It is also contemplated that a "sliding window" may be utilized for maintaining a certain configurable number of PiT instances for a virtual volume. In such a configuration, the oldest PiT instance may be removed/deleted once the system gets to the certain number of PiT instances. In one embodiment, when a PiT instance is deleted, the chunks in the corresponding PTVV of the PiT are reintegrated into the previous PiT or into the virtual volume itself (if there is no previous PiT).

It is further contemplated that the older PiT instances may be "compressed" by going to a coarser time granularity. For example, users may be able to create a restore instance for any specified time within the last three days. However, if the user choose to create a restore instance for a particular time a week ago, instead of providing the restore instance exactly to that particular time, the restore instance with a coarser granularity may be created for the nearest 5 minutes, 30 minutes, or even 60 minutes, etc. It is understood that even older PiT instances (e.g., created a month ago) may be compressed even more, for example, only to the nearest day.

In one embodiment, the compression of an older PiT instance may be accomplished by deleting specific chunk versions from the PiT (PTVV) and compressing it accordingly. For example, upon receiving a granularity definition (e.g., indicating the granularity of 5 minutes or 30 minutes, etc), a pass through of the CDP log may be performed to determine chunk versions that may be removed given the time granularity for that PiT instance. If the granularity is set to be every 5 minutes and there is more than one version of chunk within the same 5 minute interval, the most recent version within that 5 minute interval may be kept and the other versions may be deleted. It is understood that the compression may be performed in a background process and may be applicable to older PiT instances.

Figure 6:
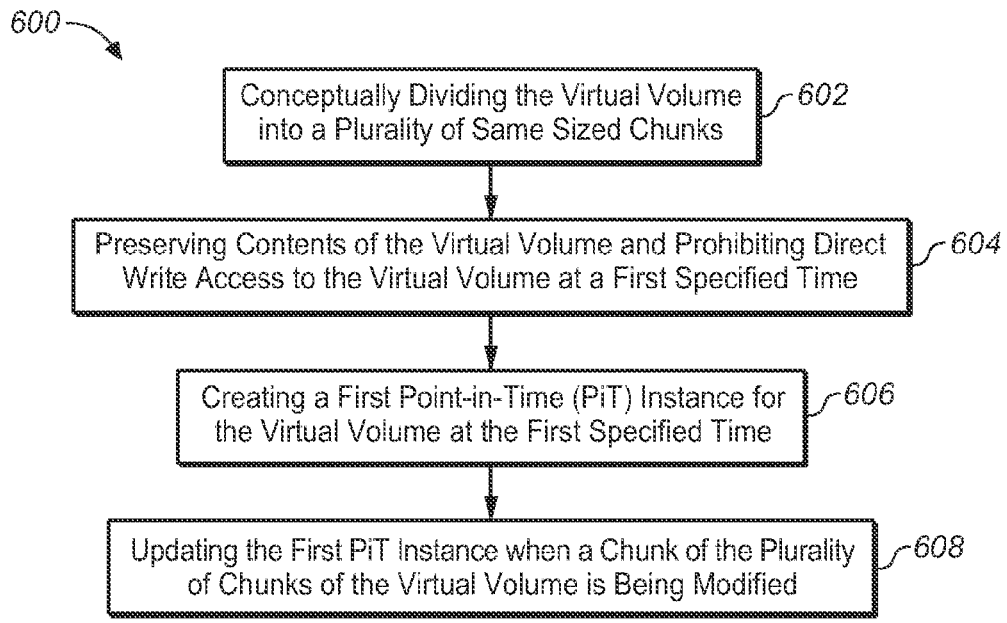
FIG. 6 is a flow chart illustrating a method for providing continuous data protection for a logical unit, in accordance with an exemplary embodiment of the present disclosure.

FIG. 6 shows a flow diagram illustrating steps performed by a continuous data protection method 600 in accordance with the present disclosure. The method 600 may be utilized for providing continuous data protection for a virtual volume. Step 602 may conceptually divide the virtual volume into a plurality of same sized chunks. Step 604 may preserve the contents of the virtual volume and prohibiting direct write access to the virtual volume at a first specified time. Step 606 may create a first PiT instance for the virtual volume at the first specified time.

The first PiT instance may include a first PTVV configured for storing modifications to the virtual volume subsequent to the first specified time, wherein data stored in the first PTVV is prohibited from been overwritten. The first PiT instance may also include a first re-allocation table including an entry for each of the plurality of chunks of the virtual volume. The first re-allocation table may be configured for providing read access to a most recent version of each of the plurality of chunks of the virtual volume. The first PiT instance may further include a first CDP log configured for providing read access to a historic version of a chunk stored in the first PTVV.

Step 608 may update the first PTVV when a chunk of the plurality of chunks of the virtual volume is modified. It is contemplated that the first PiT instance may be preserved at a second specified time, and additional PiT instances may be created in replacement of the first PiT instance for holding subsequent modifications.

Figure 7:
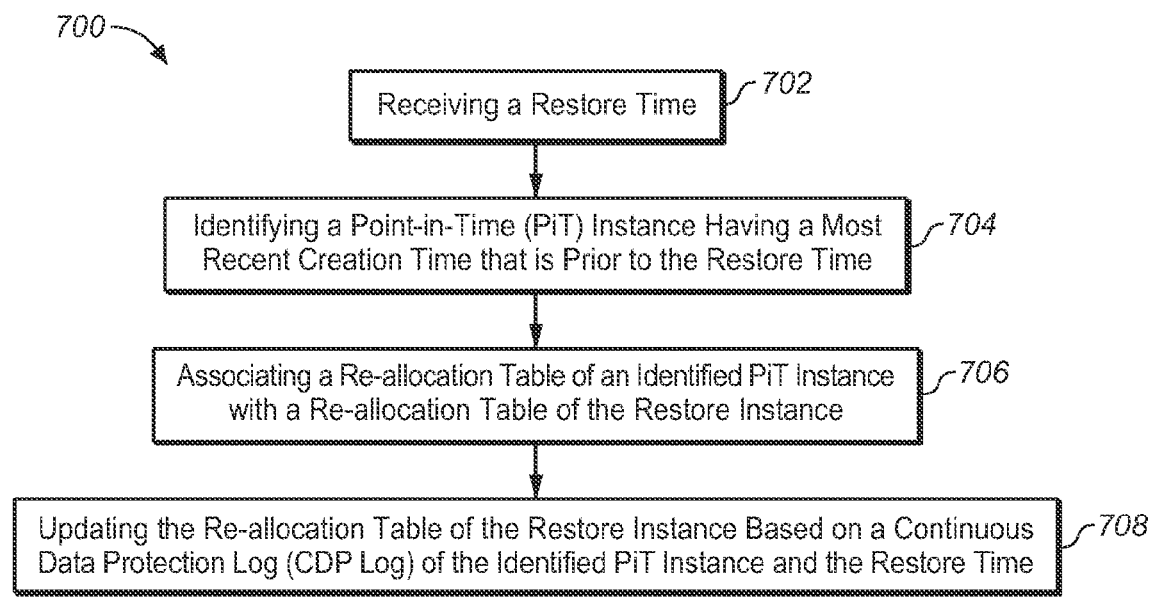
FIG. 7 is a flow chart illustrating a method for creating a restore instance for a virtual volume, in accordance with an exemplary embodiment of the present disclosure.

FIG. 7 shows a flow diagram illustrating steps performed by a restoration method 700 in accordance with the present disclosure. The method 700 may be utilized for creating a restore instance for a virtual volume. Step 702 may receive a restore time specified by a user. Step 704 may identify a PiT instance having the most recent creation time that is prior to the restore time. Step 706 may copy the re-allocation table of the identified PiT instance to the re-allocation table of the restore instance. Step 708 may update the re-allocation table of the restore instance based on a CDP log according to the restore time.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing continuous data protection for a virtual volume, comprising:
   dividing the virtual volume into a plurality of same sized chunks;
   preserving contents of the virtual volume and prohibiting direct write access to the virtual volume at a first specified time;
   creating a first Point-in-Time (PiT) instance for the virtual volume at the first specified time, the first PiT instance comprising:
      a first PiT Temporary Virtual Volume (PTVV) configured for storing modifications to the virtual volume subsequent to the first specified time, wherein data stored in the first PTVV is prohibited from been overwritten;
      a first re-allocation table including an entry for each of the plurality of chunks of the virtual volume, the first re-allocation table configured for providing read access to a most recent version of each of the plurality of chunks of the virtual volume; and
      a first Continuous Data Protection (CDP) log configured for providing read access to a historic version of a chunk stored in the first PTVV; and
   updating the first PiT instance when a chunk of the plurality of chunks of the virtual volume is being modified.

2. The method of claim 1, wherein updating the first PiT instance when a chunk of the plurality of chunks of the virtual volume is being modified further comprises:
receiving a modified content of the chunk being modified;
storing the modified content in the first PTVV without overwriting existing chunks stored in the first PTVV;
locating an entry corresponding to the chunk being modified in the first re-allocation table;
determining whether the entry corresponding to the chunk being modified is marked as allocated;
updating the first re-allocation table when the entry corresponding to the chunk being modified is not marked as allocated, further comprising:
associating the entry corresponding to the chunk being modified with the modified content stored in the first PTVV; and
marking the entry corresponding to the chunk being modified as allocated; and
updating the CDP log and the first re-allocation table when the entry corresponding to the chunk being modified is marked as allocated, further comprising:
creating a log entry in the CDP log and associating the log entry with a historic content of the chunk being modified prior to receiving the modified content; and
associating the entry corresponding to the chunk being modified with the modified content stored in the first PTVV.

3. The method of claim 1, further comprising:
preserving contents of the first PiT instance and prohibiting direct write access to the first PiT instance at a second specified time subsequent to the first specified time;
creating a second PiT instance for the virtual volume at the second specified time, the second PiT instance comprising:
a second PTVV configured for storing modifications to the virtual volume subsequent to the second specified time, wherein data stored in the second PTVV is prohibited from been overwritten;
a second re-allocation table including an entry for each of the plurality of chunks of the virtual volume, the second re-allocation table configured for providing read access to a most recent version of each of the plurality of chunks of the virtual volume; and
a second CDP log configured for providing read access to a historic version of a chunk stored in the second PTVV; and
updating the second PiT instance when a chunk of the plurality of chunks of the virtual volume is being modified.

4. The method of claim 3, wherein updating the second PiT instance when a chunk of the plurality of chunks of the virtual volume is being modified further comprises:
receiving a modified content of the chunk being modified;
storing the modified content in the second PTVV without overwriting existing chunks stored in the second PTVV;
locating an entry corresponding to the chunk being modified in the second re-allocation table;
determining whether the entry corresponding to the chunk being modified is marked as allocated;
updating the second re-allocation table when the entry corresponding to the chunk being modified is not marked as allocated, further comprising:
associating the entry corresponding to the chunk being modified with the modified content stored in the second PTVV; and
marking the entry corresponding to the chunk being modified as allocated; and
updating the CDP log and the second re-allocation table when the entry corresponding to the chunk being modified is marked as allocated, further comprising:
creating a log entry in the CDP log and associating the log entry with a historic content of the chunk being modified prior to receiving the modified content; and
associating the entry corresponding to the chunk being modified with the modified content stored in the second PTVV.

5. The method of claim 1, further comprising:
receiving a granularity definition; and
compressing chunks stored in a PTVV of a PiT instance based on the granularity definition.

6. The method of claim 1, further comprising:
removing a specified PiT instance; and
integrating a PTVV of the specified PiT instance into at least one of a previous PiT or the virtual volume.

7. The method of claim 1, wherein modifying the virtual volume occurs when a write operation is performed on a chunk of the plurality of chunks of the virtual volume.

8. The method of claim 1, wherein specifying at least one of the first and second specified time utilizes at least one of an on-demand request or a predetermined time interval.

9. A system for providing continuous data protection for a virtual volume, comprising:
means for dividing the virtual volume into a plurality of same sized chunks;
means for preserving contents of the virtual volume and prohibiting direct write access to the virtual volume at a first specified time;
means for creating a first Point-in-Time (PiT) instance for the virtual volume at the first specified time, the first PiT instance comprising:
a first PiT Temporary Virtual Volume (PTVV) configured for storing modifications to the virtual volume subsequent to the first specified time, wherein data stored in the first PTVV is prohibited from been overwritten;
a first re-allocation table including an entry for each of the plurality of chunks of the virtual volume, the first re-allocation table configured for providing read access to a most recent version of each of the plurality of chunks of the virtual volume; and
a first Continuous Data Protection (CDP) log configured for providing read access to a historic version of a chunk stored in the first PTVV; and
means for updating the first PiT instance when a chunk of the plurality of chunks of the virtual volume is being modified.

10. The system of claim 9, wherein the means for updating the first PiT instance when a chunk of the plurality of chunks of the virtual volume is being modified further comprises:
means for receiving a modified content of the chunk being modified;
means for storing the modified content in the first PTVV without overwriting existing chunks stored in the first PTVV;
means for locating an entry corresponding to the chunk being modified in the first re-allocation table;
means for determining whether the entry corresponding to the chunk being modified is marked as allocated;
means for updating the first re-allocation table when the entry corresponding to the chunk being modified is not marked as allocated, further comprising:
means for associating the entry corresponding to the chunk being modified with the modified content stored in the first PTVV; and means for marking the entry corresponding to the chunk being modified as allocated; and means for updating the CDP log and the first re-allocation table when the entry corresponding to the chunk being modified is marked as allocated, further comprising:

means for creating a log entry in the CDP log and associating the log entry with a historic content of the chunk being modified prior to receiving the modified content; and means for associating the entry corresponding to the chunk being modified with the modified content stored in the first PTVV.

11. The system of claim 9, further comprising:

means for preserving contents of the first PiT instance and prohibiting direct write access to the first PiT instance at a second specified time subsequent to the first specified time;

means for creating a second PiT instance for the virtual volume at the second specified time, the second PiT instance comprising:

a second PTVV configured for storing modifications to the virtual volume subsequent to the second specified time, wherein data stored in the second PTVV is prohibited from been overwritten;

a second re-allocation table including an entry for each of the plurality of chunks of the virtual volume, the second re-allocation table configured for providing read access to a most recent version of each of the plurality of chunks of the virtual volume; and a second CDP log configured for providing read access to a historic version of a chunk stored in the second PTVV; and means for updating the second PiT instance when a chunk of the plurality of chunks of the virtual volume is being modified.

12. The system of claim 11, wherein the means for updating the second PiT instance when a chunk of the plurality of chunks of the virtual volume is being modified further comprises:

means for receiving a modified content of the chunk being modified;

means for storing the modified content in the second PTVV without overwriting existing chunks stored in the second PTVV;

means for locating an entry corresponding to the chunk being modified in the second re-allocation table;

means for determining whether the entry corresponding to the chunk being modified is marked as allocated;

means for updating the second re-allocation table when the entry corresponding to the chunk being modified is not marked as allocated, further comprising:

means for associating the entry corresponding to the chunk being modified with the modified content stored in the second PTVV; and means for marking the entry corresponding to the chunk being modified as allocated; and means for updating the CDP log and the second re-allocation table when the entry corresponding to the chunk being modified is marked as allocated, further comprising:

means for creating a log entry in the CDP log and associating the log entry with a historic content of the chunk being modified prior to receiving the modified content; and means for associating the entry corresponding to the chunk being modified with the modified content stored in the second PTVV.

13. The system of claim 9, further comprising:

means for receiving a granularity definition; and means for compressing chunks stored in a PTVV of a PiT instance based on the granularity definition.

14. The system of claim 9, further comprising:

means for removing a specified PiT instance; and means for integrating a PTVV of the specified PiT instance into at least one of a previous PiT or the virtual volume.

15. The system of claim 9, wherein modifying the virtual volume occurs when a write operation is performed on a chunk of the plurality of chunks of the virtual volume.

16. The system of claim 9, wherein specifying at least one of the first and second specified time utilizes at least one of an on-demand request or a predetermined time interval.

17. The system of claim 9, further comprising:

means for receiving a restore time;

means for identifying a PiT instance having a most recent creation time that is prior to the restore time;

means for associating a re-allocation table of an identified PiT instance with a re-allocation table of the restore instance; and means for updating the re-allocation table of the restore instance based on a CDP log of the identified PiT instance and the restore time.

18. The system of claim 17, wherein the means for updating the re-allocation table of the restore instance based on a CDP log of the identified PiT instance and the restore time further comprises:

means for identifying in the CDP log at least one log entry created for a particular chunk of the virtual volume;

means for identifying among the at least one log entry created for the particular chunk a restore log entry having a most recent creation time that is prior to the restore time;

means for locating an entry for the particular chunk in the re-allocation table of the restore instance; and means for associating the entry for the particular chunk in the re-allocation table with a chunk version that the restore log entry is associated with.

* * * * *